S. W. LEWIS.
HYDRANT VALVE.
No. 11,360. Reissued Aug. 15, 1893.
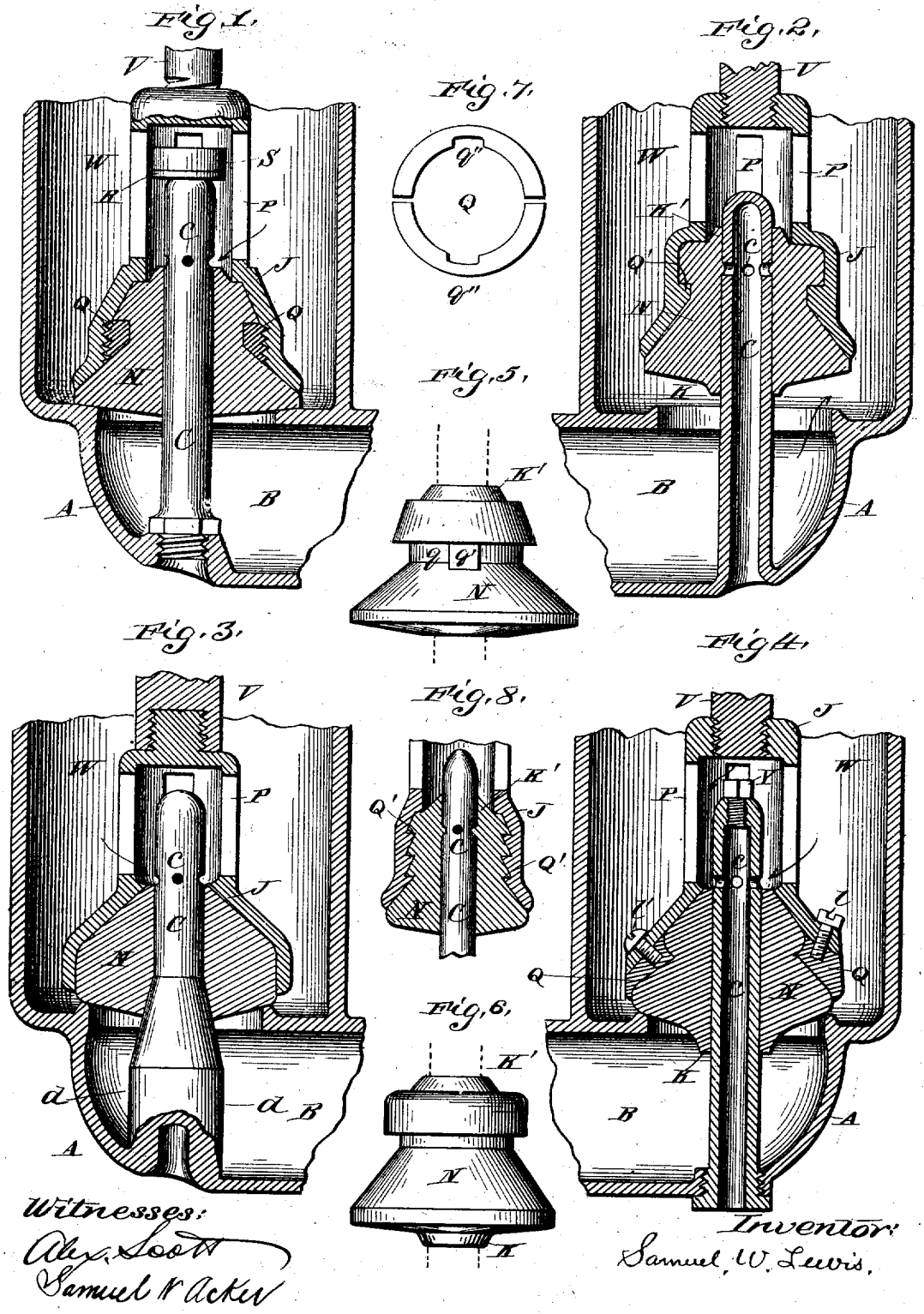

UNITED STATES PATENT OFFICE.

SAMUEL WALKER LEWIS, OF BROOKLYN, NEW YORK.

HYDRANT-VALVE.

SPECIFICATION forming part of Reissued Letters Patent No. 11,360, dated August 15, 1893.

Original No. 488,079, dated December 13, 1892. Application for reissue filed July 26, 1893. Serial No. 481,464.

*To all whom it may concern:*

Be it known that I, SAMUEL WALKER LEWIS, of Brooklyn, Kings county, New York, have invented certain new and useful Improvements in Hydrant-Valves, of which the following is a specification.

My improvement relates to the apparatus shown and described in Letters Patent No. 172,752, granted to me January 25, 1876; and the object of my invention is a simple and durable valve which will under all conditions securely pack the waste-tube and be easily adjusted to the plunger. I attain this object, first, by providing the interior of the valve-plunger with an annular sloping surface, forming an inclined plane, and a valve of corresponding form bearing upon and wholly filling the space within said inclined surface, which valve when compressed against its seat or by the pressure of water will be forced against and drifted along said annular inclined plane toward and around the waste-tube, thus securely packing said waste-tube, and at the same time constantly taking up and compensating for loss of elasticity and the usual wear caused by friction against the waste-tube; second, in the method of securing said valve within the plunger, which feature when in the form of a removable ring-holder cut or divided in sections I do not limit to a valve and plunger constructed with said inclined surface.

Figure 1 of the annexed drawings is an axial section of one form of my improved valve closed upon its seat. Fig. 2 is a similar section showing the valve open. Figs. 3 and 4 are similar sections showing modifications in details of construction. Fig. 5 is a view of the valve shown in section in Fig. 1. Fig. 6 is a view of the valve shown in section in Fig. 2. Fig. 7 is a horizontal plan of the annular ring or valve holder Q, shown in section in Figs. 1 and 4; and Fig. 8 shows a modification with a series of inclined planes broken by horizontal ledges or shoulders Q′, which latter serve to hold the valve within the plunger.

Similar letters refer to similar parts throughout the several views.

The casing A W may be of any desired size and shape provided with the usual inlet B and a suitable valve-seat.

Cast with the base, as shown in Figs. 2 and 3, or screwed to it, as shown in Figs. 1 and 4, or otherwise secured to the base, is the waste-tube C, which is fully described in my said patent.

In Fig. 1 the waste-tube is open at the top and covered by the gravitating stop-valve R S. In Fig. 4 it is closed at top by the removable screw-plug Y, and in Figs. 2, 3, and 8 it is shown with a solid round or pointed top.

Attached to the operating-stem V is the valve-holding plunger J, surrounding the waste-tube, the lower part of said plunger being preferably provided with interior inclined surfaces, within which is contained the valve N, the upper part of the plunger J, with slots P, being practically the same as described in my said patent.

My improved valve may consist of leather, rubber, vulcanized substance, or other suitable material hard or soft, and made either with or without the flexible lipped or cupped edges K K′ at bottom and top.

The valve is preferably provided with a neck $q$ to engage with a corresponding shoulder or valve holder in the plunger, which shoulder may be fixed or adjustable, and preferably annular, though, if preferred, it can be angular or broken, forming detached shoulders to engage with the valve, or otherwise.

When used with the fixed shoulder or valve holder Q′, as in Figs. 2 and 8, the valve must be sufficiently elastic to pass by compression within the shoulder or shoulders. For a harder and less-yielding valve, which will not pass such fixed shoulder I have provided the removable ring or valve holder Q, which fits into the annular recess or neck of the valve, and which in Fig. 1 is shown screw-threaded on its periphery to facilitate adjustment of the valve N within the plunger. The valve N can be cast or vulcanized within the ring Q, or said ring can be cut in two halves, as shown in Fig. 7, in which form it can be fitted to the neck $q$ of valve N, Fig. 5, on which neck in this instance are one or more projecting lugs $q'$, which fit into corresponding recesses $q''$ in the ring Q, Fig. 7, to prevent slipping of the parts when screwing the valve into the plunger. The ring-holder Q can be made without the screw-thread shown in Fig. 1 and secured to the plunger by screws or pins, as shown by the two modifications $l$

*l'*, Fig. 4, or otherwise. In small sizes it is practicable to dispense with the annular shoulder Q Q', either adjustable or fixed, and secure the valve within the plunger with cement, as in Fig. 3, or by other suitable means, owing to the fact that in this form of construction the circumferential surface of constant contact of the valve and plunger is so much greater than the lesser surface of contact against waste-tube and seat, that the former becomes an adhesive contact, and when the valve is opened it clings to the plunger because of the larger surface and breaks away from the smaller surface (of the waste-tube and seat) without displacement or injury.

In Figs. 2 and 4 the bottom of the valve N is provided with a lip or cup shape K, as suggested in my said patent, "to hug the waste-pipe more securely;" but such vantage is only temporary, owing to the fragile nature of the cupped edge. Hence I usually prefer a valve with slightly convex or beveled bottom, as in Figs. 1, 3, and 8, which is more durable and has proved to be as effectual, whether elastic or hard, when compressed against the inclined plane in closing the valve. As a full equivalent for the interior sloping surface of the plunger, the waste-tube can be made larger at bottom, tapering upward—that is, slightly wedge-shaped—and the hole through the lower part of valve N of corresponding size and shape, as shown at *d d*, Fig. 3.

The operation of my improved hydrant is the same as described in my previous patent, opening the valve by elevation acts to securely close the waste vent *c*, as shown in Fig. 2 and depressing the plunger J acts to close the valve and to open the waste vent *c* as in Fig. 1.

I do not limit myself to the precise form of valve seat shown, nor to the precise interior form of plunger J and corresponding form of valve N shown as it is evident, similar modifications will accomplish the same result, provided the valve wholly fills the lower end of plunger J substantially as set forth.

I claim as my invention—

1. In a hydrant, the combination, with the vertical waste-tube and a suitable valve-seat, of a plunger surrounding said waste-tube and provided with an interior annular sloping surface forming an inclined plane and a valve of corresponding form, which valve when compressed by closure upon its seat or pressure of water upward within said plunger will be forced along said inclined plane toward and around said waste-tube, substantially as described.

2. The combination, with the vertical waste-tube and a suitable valve-seat, of the plunger J, surrounding the said waste-tube and provided with the interior sloping surface, and valve N, wholly filling the space within said sloping surface and bearing upon it in such manner that when compressed upward it will be forced within said plunger and against the waste-tube C, substantially as and for the purpose set forth.

3. In a hydrant, the combination, with the valve-seat, the waste-tube having an inclined enlargement, and a valve-plunger surrounding said waste-tube, of a valve carried by said plunger and surrounding said waste-tube and arranged to engage the inclined enlargement when closed, whereby said valve is caused to pack the waste-tube, substantially as described.

4. In combination with the valve-seat, the waste-tube C, valve N, and plunger J, the adjustable and removable holder Q, divided in sections and connecting the valve and plunger, substantially as described.

5. The combination, with the waste-tube valve surrounding said waste-tube and hollow plunger carrying said valve, of the valve-holder Q Q', fitting into and securing said valve against the inclined plane within the plunger, substantially as described.

6. The combination of the valve-seat, waste-tube C, plunger J, having interior inclined surfaces, and valve N, filling the space within and bearing upon said inclined surfaces, substantially as and for the purposes described.

SAML. WALKER LEWIS.

Witnesses:

D. P. COWL,

CH. IRELAN.